United States Patent
Rafier et al.

(10) Patent No.: US 6,657,042 B2
(45) Date of Patent: Dec. 2, 2003

(54) PROCESS FOR MANUFACTURING HOMO- AND COPOLYESTERS OF LACTIC ACID

(75) Inventors: Gerald Rafier, Potsdam (DE); Jacqueline Lang, Berlin (DE); Monika Jobmann, Buxtehude (DE); Inna Bechthold, Berlin (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 10/102,064

(22) Filed: Mar. 19, 2002

(65) Prior Publication Data

US 2003/0060595 A1 Mar. 27, 2003

(30) Foreign Application Priority Data

Mar. 19, 2001 (DE) .......................... 101 13 302

(51) Int. Cl.[7] .......................... C08G 63/82; C08K 3/10
(52) U.S. Cl. .................. 528/357; 528/361; 528/365; 525/450; 524/783; 524/784
(58) Field of Search ................. 528/357, 361, 528/365; 525/450; 524/783, 784

(56) References Cited

U.S. PATENT DOCUMENTS 5,484,881 A  * 1/1996 Gruber et al. .............. 528/354
6,005,068 A  * 12/1999 Gruber et al. .............. 528/354

FOREIGN PATENT DOCUMENTS

EP      0 627 453 A2    12/1994
EP      0778304    * 6/1997

OTHER PUBLICATIONS

"Biodegradable polymers. 6th Comm. Polymerization of ∈–caprolctone", G. Rafler and J. Dahlmann, , Acta Polymer (1992).
"Poly(Iactones. 9† Polymerization Mechanism of Metal Alkoxide Initiated Polymerizations of Lactide and Various Lactones ", Hans R. Krichedorf, Martin Berl, and Nico Scharnagl, 1988 American Chemical Society.
"Biodegradable polymers, 7th Comm. On the mechanism of ring–opening polymerization of cyclic esters of aliphatic hydroxycarboxylic acids by means of different tin compounds", J. Dahlmann and G. Rafler, Acta Polymer (1993).
"Biodegradable Polymers, 8th Comm. On the kinetics of ring–opening polymerization of 1,3–dioxane–2–one (trimethylene carbonate)", G. Rafler, 168 Acta polymer (1993).
"Polylactide (PLA)–A New Way of Production", S.Jacobssen, PH. Degree, H. G. Fritz, PH Dubois, and R. Jerome, Polymer Engineering and Science, Jul. 1999, vol. 39, No. 7.
"Controlled Release Systems of Biodegradable Polymers 4th Comm: Hydrophobic and hydrophilic polylactides for drug delivery systems", Gerald Rafler and Monika Johnson, 1st, 2nd and 3rd Comm., see Pharm. Ind. 56, No. 6, p. 565, No. 7, p. 655, and No. 8, p. 753 (1994).
"Recent Advantages in Ring–Opening Polymerization of Lactones and Related Compounds" Anders Lögren and Ann–Christine Albertsson, 1995 by Marcel Dekker Inc.

* cited by examiner

*Primary Examiner*—Samuel A. Acquah
(74) *Attorney, Agent, or Firm*—Young & Basile, P.C.

(57) ABSTRACT

A process is provided for manufacturing homo- and copolyesters of lactic acid by ring scission polymerization of its cyclic monomers in the presence of an initiator. Polymerization is carried out in the molten phase in the presence of an initiator system containing a compound of tin and at least one additional initiator chosen from the compounds of metal of the fourth subgroup.

9 Claims, 3 Drawing Sheets

Batch polymerization of L,L-dilactide at 195°C in the presence of 7.5*10⁻⁵ mol/mol tin II-octonoate
Agitators 1 and 2:    cross-arm agitators
Agitator 3:              screw agitator Batch polymerization of L,L-dilactide at 195°C in the presence of 7.5*10$^{-5}$ mol/mol tin II-octonoate Agitators 1 and 2:   cross-arm agitators
    Agitator 3:   screw agitator Batch polymerization of L,L-dilactide at 195°C in the presence of 2.5*10⁻⁵ mol/mol tin II-octonoate / 10*10⁻⁵ mol/mol titanium-IV-isopropylate Agitator 1:   cross-arm agitator
    Agitator 3:   screw agitator Batch polymerization of L,L-dilactide in the presence of $2.5*10^{-5}$ mol/mol titanium-IV-isopropylate at different reaction tempertures
Agitator:   Screw agitator

PROCESS FOR MANUFACTURING HOMO- AND COPOLYESTERS OF LACTIC ACID

BACKGROUND OF THE INVENTION

The invention relates to a process for manufacturing homo- and copolymers from lactic acid by ring scission polymerization of cyclic esters or diesters in the presence of an initiator/catalyst system which selectively accelerates chain growth. A mixture consisting of initiators is used. The process is thus particularly suitable for the continuous or discontinuous manufacture of these biologically degradable polyesters in high-capacity plants and with standard dwell time characteristics.

Homo- and copolyesters of L- or D, L-lactic acid can be employed as biologically degradable polymer materials with typical thermoplastic processing and application properties in a variety of ways as packaging plastic, in hygiene products, for non-returnable articles but also as surgical implant material or a galenic auxiliary agent for parenteral systems of dispensing medication. Consistent product properties at the molecular level, such as molar mass and molar mass distribution in the case of the homo- and copolyesters, retention of chirality with the poly-L-lactic acid or comonomer ratio and comonomer distribution in the case of the copolyesters, are the absolute precondition for the use of these homo- and copolyesters in the application areas mentioned. This consistency can be achieved under engineering conditions only with equally reliably manageable synthesis processes, which in addition must exhibit a high tolerance for unavoidable substrate-specific and process fluctuations.

As a result of the equilibrium constant of the ring-chain equilibrium, high molecular polyesters of lactic acid can be produced only by ring scission polymerization of the cyclic diester of lactic acid (L,L- or D,L-3,5-dimethyl-1,4-dioxan 2,5 dion, hereafter called L,L- or D,L-dilactide). In order to initiate or catalyze this polymerization reaction metal organic compounds of tins are preferably used (ref. for example, J. Dahlmann, G. Rafler: *Acta Polymerica*, 44 (1993) 103 and the literature cited there). Proposals for engineering processes, performed as mass polymerization at the molten stage at temperatures of 185–200° C., involve almost exclusively tin-II-octanoate, which is supposed to accelerate ring scission polymerization especially efficiently (U.S. Pat. No. 5,484,881). In addition to tin-II-octanoate, other compounds of bivalent and tetravalent tin are frequently described as initiators or catalysts (c.f. U.S. Pat. No. 5,484,881). But additional metal compounds, such as alkoxyds of tin, lead, magnesium, titanium or zirconium, are also mentioned primarily as potentially usable, catalytically active substances, without technical processes based on these initiators or catalysts being described (S. Jacobson, Ph. Degee, H.-G Fritz. Ph. Dubois, R. Jerome: *Polymer Eng. Sci.* 39, (1999), 1311; W. M. Stevals, P. J. Dijkstra, J. Feihen, TRIP 5 (1997) 300).

The choice of initiator in ring scission polymerization is additionally determined in great measure by the substrate to be polymerized. Cyclic monoesters, such as caprolactam, or cyclic carbonates, such as 3-dioxan-2-on (trimethylene carbonate), are far less sensitive with respect to the initiator than, for example, dilactide or 1,4 dioxan-2,5-dion (diglycolide) (G. Rafler, G. Dahlmann: *Acta Polymerica* 43 (1992) 91; G. Rafler: *Acta Polymerica* 44 (1993) 168), and they can consequently be polymerized without difficulty in the presence of the initiators named in U.S. Pat. No. 5,484,881 or in other places (c.f. for example, also A. Loefgren, A.-C. Alberson, P. Dubois, R. Jerome: *Rev. Macromol Chem. Phys.* C35 (1995) 379), if the essential additional constraints for this polymer formation reaction, such as purity of the monomers, exclusion of water and minimization of thermal loads, are observed when the process is being carried out.

Initiators containing tin, preferably tin-II-octonoate, which is the most used according to the prior art, cause a polymerization profile which is hard to manage technically with regard to molar mass of the polymer, with an extremely steep rise at the beginning of the reaction, a molar mass maximum undefined in its absolute amount and a pronounced degradation of the polymer after passing through the maximum (c.f E. Dahlmann, G. Rafler: *Acta Polymerica* 44 (1993) 107). This polymerization profile, unsuited to a technical process, is heavily dependent on concentration, where in contrast to ionic and radically initiated polymerization processes, at least for the majority of tin-initiated polymerizations, conversion and molar mass run synchronously, that is, polymerization speed and high conversion also result in high molar masses.

Besides the technical problems with reaction in ring scission polymerization, which result primarily from the reaction profiles, from an ecotoxicological viewpoint the orientation also ought to be toward the lowest possible concentrations of tin in the polymers, since these aliphatic polyesters are intended primarily for biodegradable materials, with disposal by means of composting. Heavy metal compounds are introduced directly into the biosphere during disposal through composting.

In spite of the multiple problems that tin-bearing initiators cause, these compounds are favored for engineering process proposals because of their high activity in the polymerization process, independently of the substrate to be polymerized Independently of the type of initiator and the initiator concentration and the particular cyclic esters or diesters to be polymerized, ring scission polymerization is characterized by high sensitivity to contamination in the initial substances and polymerization additives (initiators, co-initiators). The slightest contamination of the monomers or entry of humidity or air into the polymerization reactors and fluctuations in the process parameters cause considerable problems in the technical process for producing these aliphatic polyesters.

A series of measures that are intended to contribute to management of the technical process and to the reproducible formulation of product properties is therefore proposed for the technical management of the polymerization process, which is well worked out and unproblematic in execution for laboratory conditions. These measures involve all the aspects mentioned that make the process more difficult.

Most often, long-chain alcohols are used as co-initiators of the metal organic polymerization catalysts to initiate chain growth, in order not to mask or to relativize the non-defined influence of monomer or system contaminations containing hydroxyl groups on conversion and molar mass in ring scission polymerization (c.f. for example, EP-PS 0 778 304; U.S. Pat. No. 6,005,068). The addition of dodecyl alcohol or stearyl alcohol, for example, helps the reproducibility of molar mass. Besides that, in high proportions these additives containing hydroxyl groups can also be used to chemically modify the polyesters. Hydrophobic properties, for example, can be generated using stearyl alcohol (EP-PS 0 778 304). Through co-initiation with polyethylene glycols the polyesters become more hydrophilic (G. Rafler, M. Jobmann: *Pharm. Ind.* 58 (1996) 1147.

In DE-PS 43 18 204 the sensitivity of ring scission polymerization as the result of contamination or byproducts from the monomers is overcome in a different way. In this patent, in addition to new, zirconium-based initiators silicon-organic additives are described, which, by reacting with monomer byproducts containing hydroxyl groups or water from the air or the inert gas, remove them from the system and thus increase process reliability.

Except for the effects of foreign substances, such as monomer byproducts or other contamination of the reaction system, reproducibility of the synthesis process and consistency of molecular product properties are determined to a great extent by the type and concentration of the initiators employed and process temperature. As a result of the balanced character of ring scission polymerization (ring-chain equilibrium of monomer esters or diesters and linear polymer molecules) the reverse formation of the monomer from the polymer is also catalyzed by the initiator (cyclizing depolymerization). Not only must this balanced character of ring scission polymerization be taken into account when designing the technology and the apparatus for the process but the cyclizing depolymerization of the polyester causes problems primarily in the thermoplastic deformation of these polymers. The often described "back-biting" reaction, which results in linear or cyclic products of lower molar mass, is catalyzed by the initiators employed (c.f. for example, K. R. Kricheldorf, M. Berl, N. Scharnagl: *Macromolecules* 21 (1988) 268). In addition to the reversible depolymerization or degradation processes of these polyesters, which are caused by the mechanics of the reaction, irreversible chain splitting from thermal degradation reactions cannot be excluded. These thermolytic processes result in unspecific waste products which remain on the polymer and, depending on the degree of this thermolysis, to discoloration of the polymer all the way to formation of gel particles. While reversible depolymerization with reverse formation of the monomer or the co-monomers is a function of the type and concentration of the initiator and process temperature, thermal degradation is determined almost exclusively by temperature.

The repression of cyclizing depolymerization during preparation and processing can be carried out efficiently by chemically masking the initiator by means of complexing agents in the case of polyesters which are produced in the presence of tin, titanium or zirconium initiators. Tropolone and its derivates are especially suitable for tin compounds (DE-PS 195 37 365;V U.S. Pat. No. 5,760,119). However, the technical implementation of these processes creates difficulties, because these complexing agents can only be added following completion of the polymerization process of the highly viscous polymer melt. This requires not only an additional compounding stage with twin-screw extruders or equivalent static mixers, but it is extremely difficult, even with polyactide-based master batches containing complexing agents, to obtain a homogenous distribution of the complexing agents in the melt. This homogenous distribution of the complexing agents is, however, an absolute precondition for deactivating the initiator.

Unspecific thermo-oxidative and hydrolytic degradation reactions, primarily during the deformation of these aliphatic polyesters, are inhibited by organic phosphor compounds (thermo-oxidation) or water-binding additives (hydrolysis), such as carbodiimides, activated acid derivatives or isocyanates (c.f. for example, U.S. Pat. No. 6,005, 068).

Taking as the starting point the difficulties in technical management of ring scission polymerization caused by initiators and the unsatisfactory consistency of product properties of polyesters synthesized by this method, the object of this invention is to propose a process which allows the production of melt-stable polyesters with consistent molecular parameters by ring scission polymerization discontinuously or continuously with broadly variable dwell time characteristics and variable plant equipment.

SUMMARY OF THE INVENTION

Under the invention it is therefore proposed that ring scission polymerization is carried out in the presence of an initiator system of tin and at least one additional compound of metals of the IV subgroup.

The preference here is for a combination of tin and titanium or zirconium initiators, where the components can be present in the form of a mixture of both initiators (same or different types of tin and titanium compounds) or in a chemical compound of tin and titanium or zirconium (polynuclear complexes).

The method of proceeding under the invention permits assured management of ring scission polymerization and it results in a polymer with higher thermal stability under production and processing conditions and with more defined molecular non-uniformity (expressed by $M_w/M_n$). Specifically the reaction profiles with pronounced extremal character in the molar mass (c.f. FIG. 1 and E. Dahlmann, G. Rafler: *Acta Polymerica* 44 (1993) 107), which are typical of tin-II-octonoate and difficult to reproduce under engineering conditions, are avoided with the use of the initiator system in accordance with the invention (c.f. FIG. 2).

Titanium-bearing initiators by themselves, such as titanium-tetraalkoxides or aryl titanium compounds, are unsuited to engineering applications since they mostly result only in comparatively low molar masses with a slow polymerization curve (c.f. FIG. 3).

The agitator-dependent differentiations of the molar mass-time profiles in examples 1 and 2 result from the different efficiencies of the agitators with respect to the microblending of highly viscous melts. Mixers 1 and 2 are cross-arm agitators with a different number of arms, agitator 3 is a heliform blade agitator (screw agitator). This sensitivity in the area of micro-("chemical" reaction speed) and macro-kinetics (macroscopically observable reaction speed) is typical of chemical processes in which, in addition to the chemical reactivity of the substrate (growth speed of the polymer), material transport processes of the reactants (prevention of diffusion), material tranfers with reactions involving phase change, accessibility of reactive groups, high viscosities of the reaction medium, etc.) play a fundamental part. The more uniform reaction profiles with the process according to the invention for different types of agitation conditions with the proposed initiator are in addition to the greater molar mass stability and the non-time dependent molar mass distribution the higher process quality combination.

The average molar masses of the polymers given in the examples 1 are determined by gel chromatography in tetrahydrofuran from extracted and dried polymer samples. The gel chromatography separation is performed on styragel with simultaneous determination of concentration (refractive index) and molar mass (diffused light photometry) of the individual polymer fractions. This allows a very precise direct determination of molar mass, which is clearly superior to the methods often used employing calibrating substances of a known molar mass to calibrate the methodology or relative measuring methods, such as solution viscometry. The simultaneous determination of both average values for molar mass also permits an extremely precise determination of the molecular non-uniformity from the quotients of both average values for molar mass ($M_w/M_n$ in Table 1). The molecular non-uniformity is a fundamental product parameter for a polymer material, because, along with the molar mass, it is a critical codeterminant of the application-relevant polymer properties at the molecular level. The deformation and material properties of a plastic are the result of the combination of these polymer properties and the morphological properties of the polymer solid. Here too the superiority of the procedure according to the invention is evident compared to the known prior art. Not only is the technological manageability of ring scission polymerization significantly improved, but products of equal quality are obtained independently of the length of the process.

TABLE 1

$M_w/M_n$ dependent on polymerization time

| Time [min] | $M_w/M_n$ Example 1 Sn-II-octonoate | Example 2 Initiator combination |
| --- | --- | --- |
| 15 | 1.54 | 1.85 |
| 30 | 2.56 | 2.06 |
| 60 | 3.20 | 2.09 |
| 90 | 2.31 | 2.02 |
| 180 | 2.32 | 2.10 |

Titanium or zirconium preferably represents the higher proportion in the initiator combination, where the ratio of the elements to each other of tin: titanium or zirconium can be varied=1:10 up to 2:3. The ratio of the initiators to each other is determined by the molecular polymer parameters that are being sought, the technological process regime and the plant equipment. The higher the proportion of tin in the initiator system with the same molar ratio of initiator system to monomers, the more reactive the start of the reaction. In the case of discontinuous process methods, high titanium contents are used in the initiator; in the case of continuous process methods more reactive systems with lower proportions of titanium and higher proportions of tin can be reliably managed.

As a result of the uniformly kinetic character of ring scission polymerization of cyclic esters and diesters, the choice of initiators is primarily determined by their solubility in the monomer or polymer melt. Suitable tin compounds for the initiator combination with tin and titanium compounds are tin-II -carboxylates, tin-IV-alkoxides, dialkoxy-tin-oxides, trialkoxy-tin-hydroxides and tin-IV-aryls. Of the known organically soluble titanium compounds, primarily titanium-IV-alkoxides and titanium-IV-acetylacetones can be used, in the case of zirconium compounds, zirconium-IV-ethylate, zirconium-octonoate and zirconium-acetylacetonate can be used as components for the initiator combination according to the invention.

The concentration of the initiator combination according to the invention can be freely chosen within broad limits. It is guided principally by the technological requirements of the plant (in the case of the synthesis of poly lactic acids: capacity of the individual process stages: fermentation lactic acid; polycondensation, depolymerization, purification L,L-dilactide or D,L-dilactide; ring scission polymerization poly-L-lactide or poly-D-lactide;demonomerization poly-L-lactide or poly-D-lactide) and the molar mass of the final product that is being sought. The preferred range of concentration for the initiator system is $10^{-5}$ to $10^{-3}$ mol/mol per monomer unit; but higher concentrations up to $10^{-2}$ mol/mol can be used without any difficulty if this is required for reasons relating to technology, plant equipment or for material-specific reasons.

Polymerization temperature is similarly variable within a relatively broad range above the melting temperature of the polymer. Temperatures of 180° C. to 235° C. can be chosen for the polymerization of the L,L-dilactide without disruptive degradative reactors. Lower polymerization temperatures can be used for the polymerization of the D,L-dilactide, starting at 125° C., because of the lower softening temperature.

Under the invention the initiator system is also employed for the synthesis of statistic and non-statistic binary or ternary copolymers by ring scission polymerization. The statistic copolymers are produced by simultaneous addition (discontinuous) or metering (continuous) of the monomer esters or diesters. Non-statistic copolymers are obtained by gradual addition of comonomers or preferably reactive compounding of the homopolyesters in high-intensity mixing reactors, such as kneaders or twin-screw extruders.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

The invention is explained in more detail below by examples and figures.

DESCRIPTION OF THE PREFERRED EMBODIMENT

EXAMPLE 1

Figure 1:
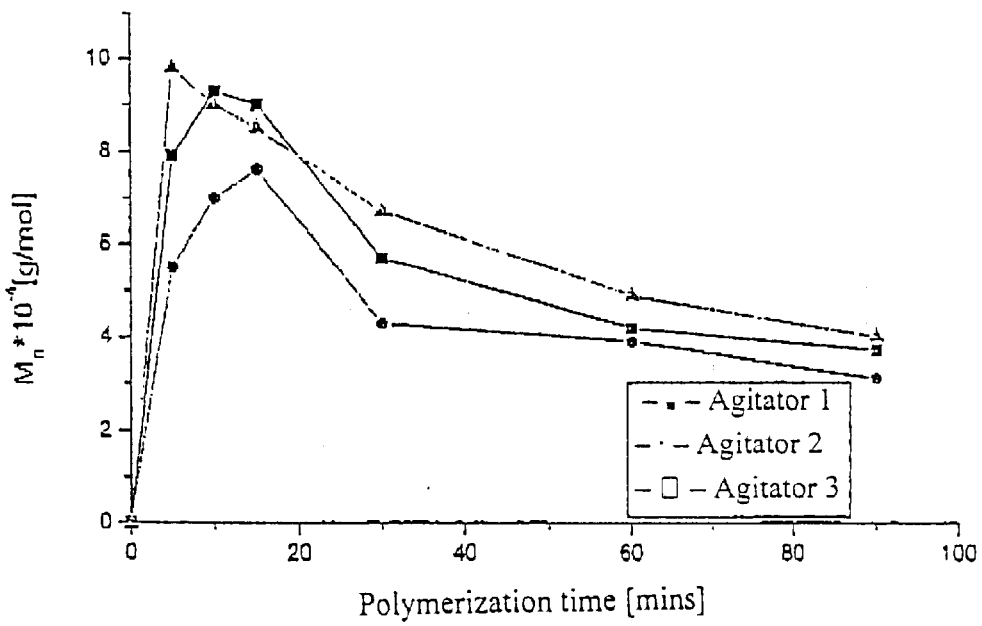
FIG. 1 shows batch polymerization of L,L-dilactide at 195° C. in the presence of a tin catalyst.

Comparative Examples with Different Types of Agitator 72 grams of L,L-dilactide (0.5 mol) purified by re-crystallization and carefully dried are brought to a molten state under inert gas in a cylindrical glass reactor using a cross-arm agitator (agitators 1 and 2 in FIG. 1) or a screw agitator (agitator 3). Upon reaching the specified temperature, the initiator in the form of a 0.1 percent solution in toluene is added to the agitated monomer melt. Samples are taken from the polymerizing melt to determine the progress of polymerization, from which, following suitable sample preparation by extraction or desorption, mass (for the monomer conversion) and molar mass are determined. The extraction is carried out with methanol in Soxhlet apparatus; for desorption the sample is dissolved in dimethyl formamide and the polymer is precipitated in methanol. Conversion and molar mass are determined from the dried polymer samples by gravimetry and gel chromatography respectively. Depending on the degree of blending, the molar mass-time curves shown in FIG. 1 for the polymerization of the L,L-dilactide are obtained.

EXAMPLE 2

Figure 2:
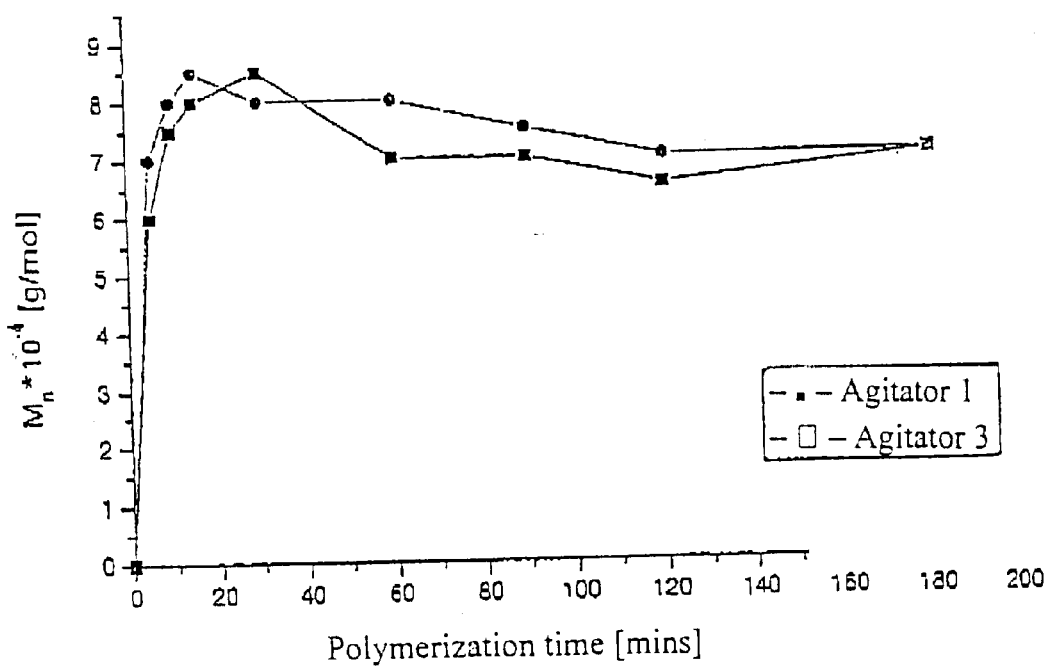
FIG. 2 shows batch polymerization in the presence of an initiator system according to the invention.
Figure 3:
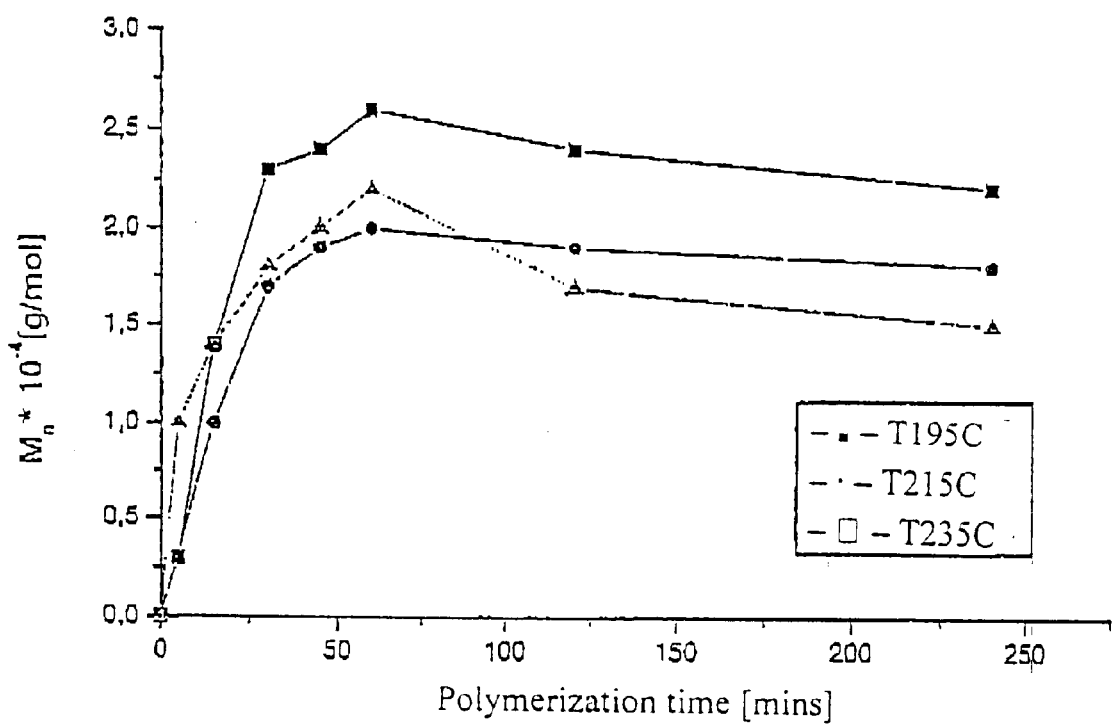
FIG. 3 shows the results of batch polymerization of L,L-dilactide in the presence of a titanium catalyst.

Analogous to example 1, 72 grams of L,L-dilactide (0.5 mol) purified by re-crystallization and carefully dried are brought to a molten state in a cylindrical glass reactor under inert gas using a cross-arm agitator (agitator 1 in FIG. 2) or screw agitator (agitator 3). Upon reaching the specified temperature, the initiator mixture consisting of $2.5*10^{-5}$ mol/mol tin-II-octonoate, in the form of a 0.1 percent solution in toluene, is added to the agitated monomer melt. Following preparation of the samples in the same way as for example 1, the molar mass-time curves for the polymerization of the L,L-dilactide shown in FIG. 2 were obtained, depending on the thoroughness of the blending.

EXAMPLE 3

Analogous to example 1, 72 grams of L,L-dilactide (0.5 mol) purified by re-crystallization and carefully dried are brought to a molten state in a cylindrical glass reactor under inert gas using a screw agitator. Upon reaching the specified temperature, $2.5*10^{-4}$ mol/mol titanium tetra isopropylate, in the form of a 0.1 percent solution in toluene, is added to the agitated monomer melt. Following preparation of the samples in the same way as for example 1, the molar mass-time curves for the polymerization of the L,L-dilactide are obtained, depending on the reaction temperature.

EXAMPLE 4

Analogous to example 1, 72 grams of L,L-dilactide (0.5 mol) purified by re-crystallization and carefully dried are brought to a molten state in a cylindrical glass reactor under inert gas using a screw agitator. Upon reaching the specified temperature of 200° C., 0.08 grams ($10^{-4}$ mol/mol) of a reaction product of dibutyl tin oxide (0.1 mol),—titanium tetra butylate (0.2 mol) and n-butanol (0.2 mol) are added to the agitated monomer melt. After 20 minutes polymerization is stopped by cooling and the polymer material is re-treated by extraction with methanol to remove the monomers and by vacuum drying. Sixty grams of poly-L-lactide with an average molar mass of 95,000 g/mol are obtained.

EXAMPLE 5

3,600 grams of L,L-dilactide (50 mol) purified by re-crystallization and carefully dried are brought to a molten state under inert gas in a horizontal agitator with a discharge screw. Upon reaching the specified temperature of 195° C., the initiator mixture, consisting of $2.5*10^{-5}$ mol/mol tin-II-octonate and $10^{-4}$ mol/mol of titanium tetraisopropylate in the form of a 1-percent solution in toluene is added to the blended monomer melt. The melt is intensively blended in the closed system at 195° C. for 75 minutes in the kneader. Following preparation of the samples in the same manner as for example 1, 3,250 grams of poly-L-lactide with an average molar mass of 65,000 g/mol, a melting point of 174° C. and an optical rotation value of $[\alpha]^{20}=-156.2°$ are obtained.

EXAMPLE 6

1,800 grams of L,L-dilactide, purified by distillation and carefully dried, are premixed with the initiator mixture, consisting of 0.25 grams of tin-II-octonoate and 0.66 grams of titanium tetraisopropylate, and, while excluding entry of humidity and air, fed into a twin-screw extruder with a so-called "hard" screw configuration (high proportion of kneading elements in the case of the variably configurable screws; transporter elements/kneading elements =4/1; LD=35; 7 heating zones). With a temperature profile adjusted by means of the extruder, starting with 100° C. at the extruder inlet, 150° C. in the center areas and 180° C. at the outlet, and a rotational speed of $100^{-1}$, the average dwell time for the lactide melt in the extruder was about 15 min. The polymer melt was cooled on a conveyor belt by directing cold air over it and granulated by means of a strand granulator. The polymer granulate is extracted with methanol and subsequently dried in a vacuum. The poly-L-lactide obtained by the continuous method had an average molar mass of $M_p$=53,000 g/mol. The yield is 93.5%.

EXAMPLE 7

2,700 grams of L,L-dilactide purified by recrystallization and carefully dried, are brought to melting under inert gas together with 1,425 g (total volume: 50 mol) caprolactam in a horizontal kneader with a discharge screw. Upon reaching the specified temperature of 175° C., the initiator mixture, consisting of $2.5*10^{-5}$ mol/mol tin-II-octonoate and $2*10^{-4}$ mol/mol titanium tetrabutylate in the form of a 0.1-percent solution in toluene, is added to the blended monomer melt. The melt is blended intensively in a closed system at 175° C. in the kneader for 75 min. The poly(L-lactide(75)-co-caprolactam (25)) is demonomerized by desorption from dimethylformamide/water. After drying at 80° C. in a vacuum, 3,700 g of copolymer with an average molar mass of 112,000 g/mol is obtained.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. Process for manufacturing homo- and copolymers of lactic acid by ring scission polymerization of its cyclic monomers in the presence of an initiator, characterized in that polymerization is carried out in the molten phase in the presence of an initiator system containing a compound of tin and at least one additional initiator chosen from the compounds of metals of the fourth subgroup.

2. Process in accordance with claim 1, wherein the initiator system contains a compound of tin and at least one additional compound of the metals of titanium and/or zirconium.

3. Process in accordance with claim 1, wherein the ratio of tin to the additional initiator component, in relation to the ratio of elements to each other, is in the range of 1:10 to 2:3.

4. Process in accordance with claim 1, wherein the concentration range for the initiator system is at $10^{-5}$ to $10^-$mol/mol monomer unit of the lactic acid used.

5. Process in accordance with claim 1, wherein the initiator system is present in the form of a physical mixture and/or in the form of a compound containing a multilayer metal complex.

6. Process in accordance with claim 1, wherein the tin compound is selected from tin-II-carboxylates, tin-IV-alkoxides, dialkoxy-tin oxides, trialkoxi-tin hydroxides and/or tin-IV-aryls.

7. Process in accordance with claim 1, wherein the titanium compound is selected from titanium-IV-alkoxides and/or titanium-IV-acetylacetonate.

8. Process in accordance with claim 1, wherein the zirconium compound is selected from zirconium-IV-ethylate, zirconium octonate and/or zirconium acetylacetonate.

9. Process in accordance with claim 1, wherein the polymerization temperature is in the range of 125–240° C.

* * * * *